(12) United States Patent
Weis et al.

(10) Patent No.: US 11,044,329 B2
(45) Date of Patent: Jun. 22, 2021

(54) CLIENT APPLICATION USER EXPERIENCE TRACKING

(71) Applicant: NCR Corporation, Duluth, GA (US)

(72) Inventors: Daniel Weis, Fremont, CA (US); Pragya Tripathi, Santa Clara, CA (US); Eric Wang, Sunnyvale, CA (US); Isamu Leonard Yamamoto, Belmont, CA (US)

(73) Assignee: NCR Corportation, Atlanta, GA (US)

( * ) Notice: Subject to any disclaimer, the term of this patent is extended or adjusted under 35 U.S.C. 154(b) by 224 days.

(21) Appl. No.: 15/444,244

(22) Filed: Feb. 27, 2017

(65) Prior Publication Data

US 2018/0248963 A1 Aug. 30, 2018

(51) Int. Cl.
*H04L 29/08* (2006.01)
*H04L 12/24* (2006.01)

(52) U.S. Cl.
CPC .......... *H04L 67/22* (2013.01); *H04L 41/5067* (2013.01); *H04L 67/20* (2013.01)

(58) Field of Classification Search
CPC ...... H04L 67/22; H04L 41/5067; H04L 67/20
USPC ........................................................ 704/224
See application file for complete search history.

(56) References Cited

U.S. PATENT DOCUMENTS

| | | | | |
|---|---|---|---|---|
| 2011/0213716 A1* | 9/2011 | Ocko | ...................... | A63F 13/75 705/304 |
| 2012/0278194 A1* | 11/2012 | Dewan | ................ | G06F 11/0742 705/26.1 |
| 2014/0179238 A1* | 6/2014 | Wynn | .................... | H04W 24/02 455/67.11 |
| 2014/0282007 A1* | 9/2014 | Fleizach | ............... | G06F 3/0487 715/728 |
| 2015/0033084 A1* | 1/2015 | Sasturkar | ............ | G06F 11/0709 714/46 |
| 2015/0242860 A1* | 8/2015 | Kannan | ................... | G06Q 30/02 705/304 |
| 2016/0042359 A1* | 2/2016 | Singh | ...................... | G06F 40/58 704/2 |
| 2016/0155315 A1* | 6/2016 | McElhinney | ....... | G06F 11/0751 340/502 |
| 2016/0170996 A1* | 6/2016 | Frank | ................. | G06F 16/24578 707/748 |
| 2016/0325182 A1* | 11/2016 | Mckenzie | ............. | A63F 13/355 |
| 2016/0378585 A1* | 12/2016 | McElhinney | ...... | G06Q 10/0633 714/37 |
| 2017/0018023 A1* | 1/2017 | Roux | .................. | G06Q 30/0641 |
| 2017/0046244 A1* | 2/2017 | Vlachogiannis | ........ | G06F 9/542 |
| 2017/0052870 A1* | 2/2017 | Shuvali | ............... | G06F 11/3419 |

FOREIGN PATENT DOCUMENTS

JP 2011028429 A * 2/2011

* cited by examiner

*Primary Examiner* — Umar Cheema
*Assistant Examiner* — Tony Williams
(74) *Attorney, Agent, or Firm* — Schwegman, Lundberg & Woessner

(57) ABSTRACT

Devices and methods for client application user experience tracking may include generating a user experience score based on tracked operation and user inputs to the client application. The user experience score is transmitted to an experience tracking service (e.g., remote computer server, locally executed application).

20 Claims, 2 Drawing Sheets

CLIENT APPLICATION USER EXPERIENCE TRACKING

BACKGROUND

Companies are only able to receive a partial picture of their mobile application consumer satisfaction levels. Unless a user reports problems to the company regarding use of the application, the company is unaware of any user problems. The application may cause an electronics device to crash, the user may repeatedly receive client side errors, or the application may not perform all of the functions desired by the user. A large number of application crashes or other problems may make the user frustrated with the company. The company wants to know about these experiences so that they can provide the right messaging and support to a user in order to improve the user's perception of their brand and also so that the company's agents can be aware of these events so that they can better interact with the consumer in any interaction.

SUMMARY

Devices and methods for client application user experience tracking may include generating a user experience score based on tracked operation of the client application and user inputs to the client application. The user experience score is transmitted to an experience tracking service (e.g., remote computer server, application executed locally on computing device) associated with the company responsible for the client application.

BRIEF DESCRIPTION OF THE FIGURES

Corresponding reference characters indicate corresponding parts throughout the several views. The exemplifications set out herein illustrate exemplary embodiments of the invention, and such exemplifications are not to be construed as limiting the scope of the invention any manner.

DETAILED DESCRIPTION

Mobile and desktop computing devices are now ubiquitous. These devices (e.g., smartphones, smartwatches, tablet computers, personal digital assistants, desktop computers) execute client applications (e.g., apps) that are lines of code, stored in memory of the device, that represent instructions for execution by the computing device's processor. Typical applications may include word processing programs, games, productivity applications, or health and fitness applications. However, the applications may not always work as planned by the company producing the application. For example, the application execution may stop or the application execution may not produce the desired results that it was intended to produce in response to some user inputs. Unfortunately, due to the localized nature of these applications, the responsible company may not be aware of these problems.

In order to make a company aware of the performance of its applications and, thus, improve the user's perception of their brand, the present embodiments generate a user experience score based on tracked operation of the client application and user inputs to the client application. The user experience score may then be transmitted to an experience tracking service (e.g., remote computer server, application executed locally on computing device) associated with the company. In an embodiment, a fault code may be transmitted as well in order to enable the server to determine what may have caused a negative user experience. The company's customer service agents may then use the user experience score and/or the fault code to better interact with the user through an automatic response from the company's computer servers or from interaction with the agent.

Figure 1:
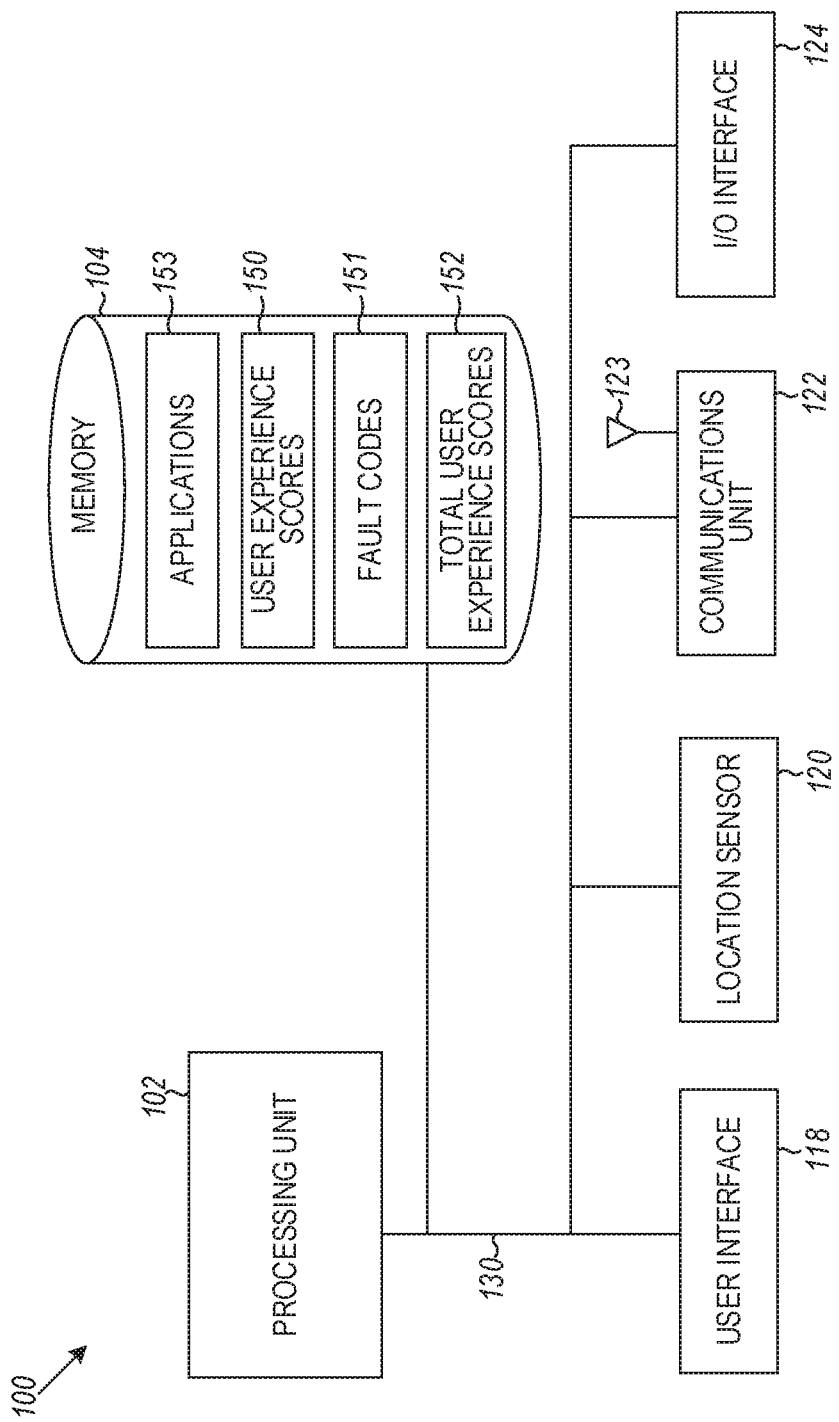
FIG. 1 shows a block diagram of an embodiment of a computing device.

FIG. 1 shows a block diagram of an embodiment of a computing device. The computing device 100 may include a processing unit 102, memory 104, a user interface 118, a location sensor 120, a communications unit 122 with antenna 123, and an I/O interface 124. The computing device 100 elements 102, 104 118, 120, 122, 124 may be all linked together over a bus 130.

The processing unit 102 may include one or more processors or other control circuitry. For example, the processing unit 102 may include one or more central processing units (CPUs), microprocessors, and/or dedicated controllers (e.g., application specific integrated circuits (ASIC)).

The memory 104 may include any type of long or short term data storage. For example, the memory 104 may include semiconductor memory such as random access memory (RAM), read only memory (ROM), or flash memory (e.g., solid state drive (SSD)). The memory 104 may also include magnetic memory (e.g., hard disk drive (HDD)), optical memory, or tape memory.

The memory 104 may store instructions that make up one or more client applications 153 (e.g., apps) executable by the processing unit 102. The memory 104 may store any user experience scores 150, fault codes 151, and/or total user experience scores 152, as described subsequently, that may be generated by operation of the application.

The client applications 153 may include various programs useful to the user such as word processing (e.g., Microsoft Word®), games, utilities (e.g., printing), World. Wide Web browsers (e.g., Firefox®), photography and image processing (e.g., Adobe Photoshop®), inventory control (e.g., NCR Counterpoint Mobile), or e-commerce (e.g., NCR Retail Online).

The user interface 118 may include any number of devices that allow a user to interface with computing device. Examples of user interfaces 118 may include a keypad, a keyboard, a microphone, a touchscreen display, or a camera. The user may use any one or more of these user interfaces 118 to provide user inputs to a client application executing on the computing device.

Examples of user inputs may include the user operating the keypad, keyboard, or touchscreen display for inputting data into the client application. User inputs may also include the user speaking (e.g., aural expression) into the microphone for inputting data into the client application. In another embodiment, user inputs may include facial expressions of the user as captured by the executing client application accessing the camera of the computing device.

The location sensor 120 may be used for determining a location of the computing device. The location sensor 120 may include any sensor that provides latitude and longitude information to allow the computing device 100 to determine its location. For example, the location sensor 120 may include any type of global positioning system (UPS) receiver.

The communications unit 122 enables the computing device 100 to communicate over a wired or wireless channel with another computing device, computer server, or network (e.g., local area network, wide area network, personal area network). For example, the communications unit 122 may include radios for communicating over a wireless channel using any radio access technology (e Bluetooth®, WiFi, cellular), Ethernet cards for using Ethernet protocols over a wired channel, or near-field communications modules. Radios in the communications unit 122 may transmit and receive over the antenna 123 coupled to the communications unit 122. The communications unit 122 may be used for transmitting one or more user experience scores, one or more fault codes, and/or one or more total user experience scores to a computer server, as described subsequently.

The input/output (I/O) interface 124 enables the computing device 100 to receive and output information. For example, the I/O interface 124 may include printers, scanners, or monitors.

The computing device 100 may be implemented as a personal computer, a network computer, a mainframe, a handheld device, a personal digital assistant, a smartphone, a wearable electronic device (e.g., smartwatch), a tablet computer, a desktop computer, or a computer server. The computing device 100 may be implemented as any microprocessor-based or controller-based electronic device.

Figure 2:
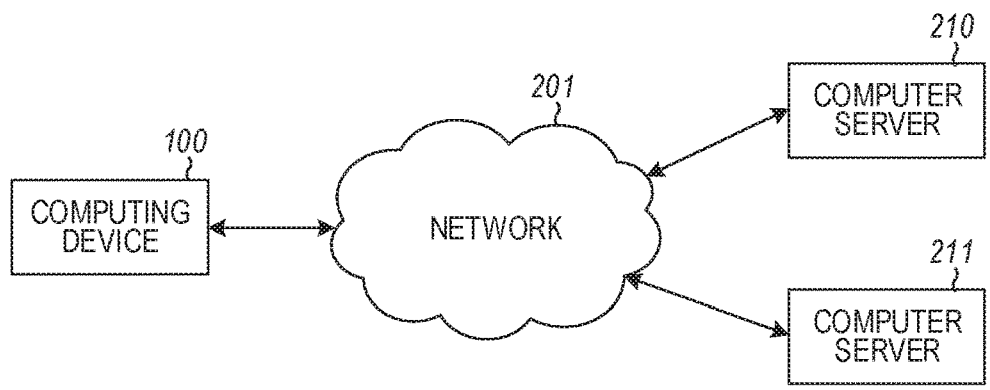
FIG. 2 shows a block diagram of an embodiment of a computer system.

FIG. 2 shows a block diagram of an embodiment of a computer system. The computer system includes the computing device 100 of FIG. 1 and one or more computer servers 210, 211. The computer servers 210, 211 may be coupled to the computing device 100 through a network 201 that may be a wired or wireless. The network 201 may be the Internet or some local area network.

Each of the computer servers 210, 211 may be associated with a different, respective company that is associated with a particular application stored in and executable by the computing device 100. Thus, results such as user experience scores and fault codes generated by a user's experience with that particular application may be transmitted back to the server 210, 211 responsible for the application.

Figure 3:
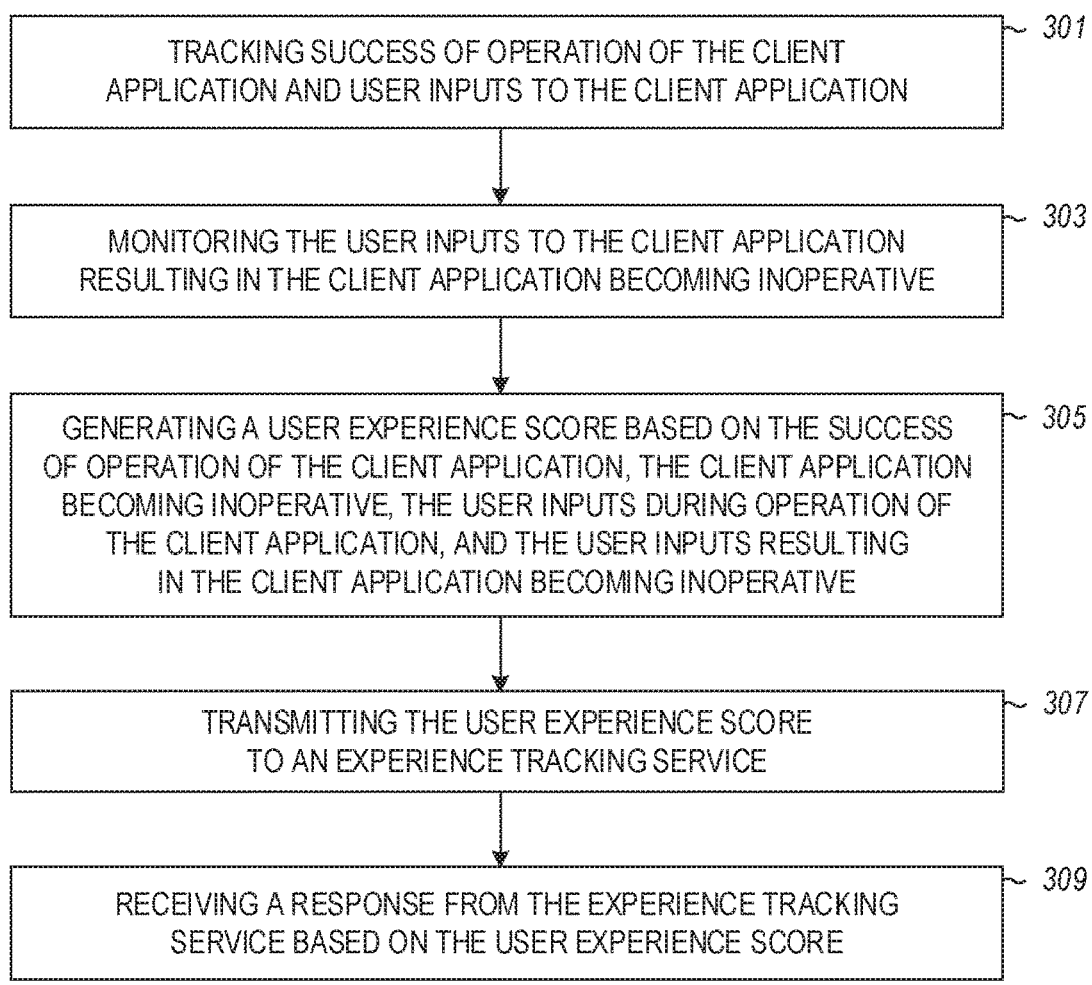
FIG. 3 shows a flowchart of an embodiment of a method for client application user experience tracking.

FIG. 3 shows a flowchart of an embodiment of a method for client application user experience tracking. The method uses a user experience score that is generated by the computing device and is based on the user's experience with the client application. The user experience score is generated without intervention by the user. In fact, the user may not even be aware that the user experience score is being generated and transmitted.

The user experience score may be a number, a letter, an icon, an emoji, or some other way to provide an indication of a user's experience with the client application. For example, if the user experience score is a number (e.g., integer), it may be in a range of numbers that each represent a different respective user experience. For example, the range of numbers may be 0-10 where "0" represents an extremely unfavorable user experience, "10" represents an extremely favorable user experience, and any number within this range indicates varying levels of experience from the extremely unfavorable to the extremely favorable.

In another example, if the user experience score is an icon or an emoji, an extremely favorable experience may be represented by a smiling face while an extremely unfavorable experience may be represented by a frowning face. A range of other faces between the smiling face and the frowning face may each represent a respective level of user experience between those two extremes. Such a visual user experience score may be more useful if transmitted to a customer service agent than only to a computer server.

Referring to FIG. 3, in block 301 the success of the operation of the client application and user inputs to the client application are tracked on the computing device. For example, success of the operation of the client application may include whether or not the application has become inoperable (e.g., no longer able to accept inputs or update the display). Success of the operation of the client application may also include whether the execution of the application has slowed down due to execution problems.

In block 303, the user inputs to the client application are monitored to determine what data the user has been inputting to the application that may have caused the client application to become inoperable. In block 305, the user experience score is generated based on the success of operation of the client application, the client application becoming inoperative, the user inputs during operation of the client application, and the user inputs resulting in the client application becoming inoperative.

The user experience score may be generated over a time period. For example, the time period may be a moving window of time that is always within a predetermined time relative to the time of the user inputs. In other words, the user experience score may be generated based on the previous thirty seconds from the present time (e.g., time of the user input). That thirty second window may be fixed relative to the present time.

During this time window, the user experience score may be constantly varying based on both positive and negative operation of the client application as well as positive and negative user inputs. For example, when the user first activates the client application to begin execution by the computing device, the user experience score may be high, assuming proper activation. As the user continues to use the client application and the client application continues to operate properly, the user experience score would remain high. When the user first experiences trouble with the client application, the user experience score may drop a relatively small amount. If the user continues to have problems with the application, the user experience score may continue to drop incremental levels. If the problem is no longer experienced, the initial problem that caused the initial drop in the score would be removed from affecting the user experience score as the time period window moves and the time of the initial problem is no longer in the window.

In block 307, the user experience score is transmitted to the experience tracking service. The experience tracking service may be located on a remote computer server, as shown in FIG. 2, or another application executed locally on the computing device. The transmission of the score may be continuous (e.g., as the time period window moves, the score is transmitted). In other embodiments, the user experience score may be transmitted at a set interval (e.g., every 10 seconds) or whenever the score changes. In another embodiment, the computing device may collect a plurality of user experience scores and store them in the computing device for later transmission or for use by the computing device to determine when to transmit the user experience scores, as discussed subsequently.

In block 309, the computing device receives a response from the experience tracking service (e.g., computer server, locally executed application) based on the user experience score. For example, the computer server, after receiving a relatively low user experience score indicating an unfavorable user experience with the client application, may transmit an indication (e.g., text, email) to the user that the company is aware of the unfavorable experience and would like to render assistance.

When the computing device collects a plurality of user experiences scores and stores them in the computing device that is executing the client application, the computing device may assign a respective weight to each score based on the importance of that particular user score. For example, a user inputting their password incorrectly may not be as important as the client application causing the computing device to slow operation or the client application becoming inoperable. Thus, the user experience score for the incorrect password entry would be assigned a weight that is lower than the weight assigned to the user experience score based on the client application becoming inoperable. These weights may be continuously summed as the plurality of user experience scores are collected. Once the total weight for the plurality of user experience scores exceeds a threshold, a total user experience score may be transmitted to the computer server.

In another embodiment, instead of summing the weights for each of the plurality of user experience scores, the user experience scores themselves may be summed as the plurality of scores are collected to generate a total user experience score. In this case, if a relatively low user experience score is considered to be unfavorable, the total user experience score may be transmitted to the computer server when the total user experience score is less than a threshold. If a relatively high user experience score is considered to be unfavorable, then the total user experience score may be transmitted when it is greater than the threshold.

The summing of either the weights or the user experience scores may also be performed by the computer server instead of by the computing device that is executing the client application. In that case, the computer server may wait until the total of either the weights or the user experience scores are at a point where a response to the computing device would be helpful. For example, if the total was less than the threshold or greater than the threshold depending on the embodiment, as previously discussed.

In another embodiment, a fault code may be generated in response to the client application becoming inoperative or having problems. The fault code may be indicative of why the application became inoperative or had a problem. The fault code may then be transmitted to the computer server so that the company is now aware of what caused the client application to become inoperative. The fault code may be associated with a particular user experience score and transmitted to the computer server at the same time. The response from the computer server may then be based on the fault code. Some less important fault codes (e.g., wrong password) may not necessitate a response while relatively more important fault codes (e.g., application inoperative) may necessitate some kind of response to the user so that the user knows that the company is aware of the problem.

The previous detailed description refers to the accompanying drawings. Wherever possible, the same reference numbers are used in the drawings and the description to refer to the same or similar elements. While embodiments and examples are described, modifications, adaptations, and other implementations are possible. For example, substitutions, additions, or modifications may be made to the elements and stages illustrated in the drawings, and the systems and methods described herein may be modified by substituting, reordering, or adding stages to the disclosed methods or elements to the discloses systems. Accordingly, the detailed description does not limit the disclosure. Instead, the proper scope of any invention disclosed herein is defined by the appended claims.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method for client application user experience tracking comprising:
generating a user experience score based on tracked operation and user inputs to a client application that executes on a computing device operated by the user, wherein the user inputs comprise the user inputting into the client application during execution of the client application using a keypad, a keyboard, or a touchscreen display and at least one user input comprises a facial expression of the user captured by the client application using a camera of the computing device, wherein generating further includes generating the user experience score based on the client application becoming inoperative from one or more of the user inputs and based on success of client application operations processed by the client application;
transmitting the user experience score to an experience tracking service when the user experience score represents a change in value that is associated with a last generated user experience score; and
when transmitting the user experience score to a customer service agent representing the user experience score as a specific emoji face associated with a range of emoji faces, each emoji face within the range representing a given level of user experience between two extremes of the range
when the user experience score indicates an unfavorable user experience with the client application, receiving, from the customer service agent, an indication directed to the user indicating that assistance would like to be rendered to the user with the client application and forwarding the indication to the user as a text message to the user indicating that a company associated with the client application is aware of the unfavorable user experience of the user and would like to render assistance to the user for the client application.

2. The method of claim 1, further comprising:
receiving a response from the experience tracking service based on the user experience score.

3. The method of claim 2, further comprising:
generating a fault code in response to the client application becoming inoperative; and
transmitting the fault code and the user experience score to a computer server.

4. The method of claim 3, wherein receiving the response from the computer server comprises receiving the response from the computer server based on the user experience score and the fault code.

5. The method of claim 1, further comprising:
collecting a plurality of user experience scores; and
storing the plurality of user experience scores on the computing device executing the client application.

6. The method of claim 5, further comprising:
assigning a weight to each user experience score of the plurality of user experience scores; and
transmitting a total user experience score to a computer server when a total of the weights for the plurality of user experience scores exceeds a threshold.

7. The method of claim 5, further comprising:
summing the plurality of user experience scores to produce a total user experience score; and
transmitting the total user experience score to a computer server when the total user experience score is less than a threshold user experience score.

8. The method of claim 5, further comprising:
transmitting the plurality of user experience scores to a computer server; and
receiving a response from the computer server based on a total of the plurality of user experience scores.

9. The method of claim 1, wherein tracking operation of the client application comprises tracking positive and negative user experiences associated with operation of the client application.

10. A method for client application user experience tracking on a computing device, the method comprising:
tracking success of operation of the client application on the computing device and user inputs to the client application, wherein the client application executes on the computing device and the computing device is operated by the user, and wherein the user inputs comprise the user inputting information into the client application using a keypad, a keyboard, or a touchscreen display of the computing device, and wherein at least one user input comprises a facial expression of the user captured by the client application using a camera of the computing device;
monitoring the user inputs to the client application resulting in the client application becoming inoperative;
generating a user experience score based on the success of operation of the client application, the client application becoming inoperative, the user inputs during operation of the client application, and the user inputs resulting in the client application becoming inoperative, and wherein user inputs include the user inputting data into the client application during execution of the client application;
transmitting the user experience score to a computer server, wherein transmitting further includes transmitting the user experience score when the user experience score represents a change in value that is associated with a last generated user experience score; and
when transmitting the user experience score to a customer service agent representing the user experience score as a specific emoji face associated with a range of emoji faces, each emoji face within the range representing a given level of user experience between two extremes of the range;
when the user experience score indicates an unfavorable user experience with the client application, receiving, from the computer server, an indication directed to the user device indicating that assistance would like to be rendered to the user with the client application on the computing device and forwarding the indication to the user as a text message to the user indicating that a company associated with the client application is aware of the unfavorable user experience of the user and would like to render assistance to the user for the client application.

11. The method of claim 10, wherein generating the user experience score comprises generating the user experience score over a time period.

12. The method of claim 11, further comprising moving the time period such that the time period is fixed within a predetermined time relative to a time of the user inputs.

13. The method of claim 10, wherein generating the user experience score comprises generating the user experience score based on positive and negative operation of the client application and positive and negative user inputs.

14. The method of claim 10, wherein tracking the user inputs to the client application comprises tracking user keypad input, user aural inputs, and user visual inputs.

15. The method of claim 10, further comprising:
collecting a plurality of user experience scores; and
associating a weight for each user experience score.

16. The method of claim 15, wherein associating the weight for each user experience score comprises:
associating a first weight for a positive user experience; and
associating a second weight for a negative user experience, wherein the second weight is larger than the first weight.

17. A computing device for client application user experience tracking, the computing device comprising:
a processor; and
a memory that includes instructions that, when executed by the processor, cause the processor to perform data processing activities comprising:
tracking success of operation of the client application on the computing device and user inputs to the client application, wherein the client application executes on the computing device and the computing device is operated by the user, wherein the user inputs comprise the user inputting information into the client application using a keypad, a keyboard, or a touchscreen display of the computing device, and wherein at least one user input comprises a facial expression of the user captured by the client application using a camera of the computing device;
monitoring the user inputs to the client application that result in the client application becoming inoperative;
generating a user experience score based on the success of operation of the client application, the client application becoming inoperative, the user inputs during operation of the client application, and the user inputs resulting in the client application becoming inoperative;
transmitting the user experience score to a computer server wherein transmitting further includes transmitting the user experience score when the user experience score represents a change in value that is associated with a last generated user experience score;
when transmitting the user experience score is transmitted by the computer server to a customer service agent representing the user experience score as a specific emoji face associated with a range of emoji faces, each emoji face within the range representing a given level of user experience between two extremes of the range;
when the user experience score indicates an unfavorable user experience with the client application, receiving, by the computing device, an indication as a text message sent to the user by the computer server indicating that a company associated with the client application is aware of the unfavorable user experience of the user and would like to render assistance to the user for the client application.

18. The computing device of claim 17, wherein the computing device comprises a personal computer, a network computer, a mainframe, a handheld device, a personal digital assistant, a smartphone, a wearable electronic device, a tablet computer, or a desktop computer.

19. The computing device of claim 17, wherein the computing device comprises further comprises; a microphone for accepting some of the user inputs.

20. The computing device of claim 19, wherein another one of the user inputs comprises a user aural expression.

\* \* \* \* \*